United States Patent [19]
Fiedler et al.

[11] Patent Number: 5,948,328
[45] Date of Patent: Sep. 7, 1999

[54] SHAPING OF MICROPARTICLES IN ELECTRIC-FIELD CAGES

[75] Inventors: Stefan Fiedler; Andreas Voigt; Thomas Schnelle; Guenter Fuhr; Torsten Mueller; Rolf Hagedorn; Jan Hornung; Henning Glasser, all of Berlin; Bernd Wagner, Looft, all of Germany

[73] Assignee: Fraunhofer Gesellschaft Zur Foerderung Der Angewandten Forschung E.V., Munich, Germany

[21] Appl. No.: 08/700,395

[22] PCT Filed: Feb. 23, 1995

[86] PCT No.: PCT/DE95/00237

§ 371 Date: Aug. 23, 1996

§ 102(e) Date: Aug. 23, 1996

[87] PCT Pub. No.: WO95/23020

PCT Pub. Date: Aug. 31, 1995

[30] Foreign Application Priority Data

Feb. 24, 1994 [DE] Germany ............... 44 06 041
Sep. 29, 1994 [DE] Germany ............... 44 34 883

[51] Int. Cl.$^6$ ....................................................... B01J 2/00
[52] U.S. Cl. .................... 264/5; 264/6; 264/10; 264/15
[58] Field of Search ................ 264/5, 10, 6, 15

[56] References Cited

U.S. PATENT DOCUMENTS

| | | | |
|---|---|---|---|
| 4,092,231 | 5/1978 | Chronberg | 204/181 |
| 4,722,787 | 2/1988 | Fombarlet et al. | 210/209 |
| 4,929,400 | 5/1990 | Rembaum et al. | |
| 5,381,683 | 1/1995 | Cowling | 71/329 |

FOREIGN PATENT DOCUMENTS

| | | |
|---|---|---|
| 3115725 | 5/1982 | Germany . |
| 3735397 | 5/1989 | Germany . |
| WO8910786 | 11/1989 | WIPO . |
| WO9305166 | 3/1993 | WIPO . |
| WO9311866 | 6/1993 | WIPO . |

OTHER PUBLICATIONS

Central Patents Index Basic Abstracts Journal, Week E10, May 5, 1982, 19618 E/10.

Ikuta & Hirowatari, 1993, Real Three Dimensional Micro Fabrication Using Stereo Lithography and Metal Molding, pp. 42–47.

Takagi, et al., Photoforming Applied to Fine Machining, pp. 172–178 (1993).

Boman and Westberg, Helical Microstructures Grown by Laser Assisted Chemical Vapour Deposition, pp. 162–167.

Ullmann's Encyclopedia of Industrial Chemistry, Fifth, Completely Revised Edition vol. A 21: pp. 304–337, 340–428 [B. Elvers et al eds.].

Ullmann's Encyclopedia of Industrial Chemistry, Fifth, Completely Revised Edition vol. B3: Unit Operations II pp. 10–1–10–44 [W. Gerhartz ed.].

Jones, Dielectrophoretic Force Axisymmetric Fields, 1986, Journ. of Electrostatics.

Fuhr, et al., Levitation, Holding and Rotation of Cells within Traps Made by High-Frequency Fields, 1992, Biochimica et biophysica Acta., 215–223.

Schnelle, et al., Three-Dimensional Electric Field Traps for Manipulation of Cells — Calculation and Experimental Verification, Biochimica et Biophysica Acta, 1993, 127–140.

Encyclopedia of Chemical Technology, Third Edition, vol. 15., Kirk–Othmer, pp. 470–493, [H. Mark et al eds.].

*Primary Examiner*—Jeffrey Mullis
*Attorney, Agent, or Firm*—Duane, Morris & Heckscher, LLP

[57] ABSTRACT

In the method proposed, microparticles suspended in a liquid or droplets suspended in a liquid with which they are immiscible are shaped by high-frequency electric fields in a three-dimensional electrode array of a size in the micrometer or submicrometer range and subsequently consolidated by prior art chemical bonding procedures or by physical methods. The disposition, geometry and control of the electrodes determine the shape of the particles. The particles themselves must have a conductivity and/or relative dielectric constant lower than the solution surrounding them. For some, this can be achieved only at certain frequencies in the kHz and MHz band which are determined by the passive electrical properties of the particles and the surrounding solution. The particles or droplets are repelled by the electrodes so that they are shaped in the free solution without making contact with any surface and can then be consolidated. This makes it possible to shape micrometer and submicrometer size particles of the kind required in chromatography, affinity biochemistry and medicine, as well as for filter systems.

48 Claims, 5 Drawing Sheets

SHAPING OF MICROPARTICLES IN ELECTRIC-FIELD CAGES

BACKGROUND OF THE INVENTION

1. Field of the Invention

The invention relates to three-dimensional microelectrode arrangements and processes for shaping suspended particles (particles, phases) or droplets of a liquid in electric fields, preferably high frequency fields, and to solidify or consolidate them under field influence. The invention also relates to certain uses of the shaped particles.

2. Prior Art

Numerous separation techniques in chemistry, medicine or biotechnology are based on the streaming through packed volumes of small particles serving as filters or carriers with extended function. In chromatography for example, there is frequent use of spherical gel particles (e. g. Sephadex), irregular granulates (activated coals, resins, mixed oxides), extruded and compressed substances[1] (molecular sieves, catalysts) or fibers and hollow fibers (Ullmanns Encyclopedia of Industrial Chemistry, Vol. A21, 305–428 (1992) VCH-Publishers Cooperation, as well as in the place cited Vol. B3, 10-1 to 10-44 (1992)). Spherical microparticles are also frequently used in dyestuff production because of their characteristic optical refraction features as a function of their size (e. g. latex or microspherical glasses in or with light reflecting paintings). On the one hand, smaller and smaller particle dimensions (micrometer range, submicrometer range) are sought to be obtained (Kirk-Othmer, Encyclopedia of Chemical Technology, Vol. 15, 470–493 (1981), J. Wiley & Sons, New York), or, on the other hand, importance is attributed to a defined size spectrum—up to monodisperse homogeneous mixtures—, in order to obtain, with a given packed volume, larger and larger surfaces for reciprocal effect with the liquid, gas or suspension streaming through.

[1]in German "Extruder-Komprimate"

The size of the exclusively spherical end products in the micrometer or submicrometer range may be strictly determined only by the processing conditions of production or adjusted by subsequent classification. The latter is valid for all irregular particles proceeding from size reduction technologies, but not for their shape. The shape of the microparticles results exclusively from their production technology and is limited to microspheres (balls) by melting technologies for all polymer materials and the aforementioned glasses produced in stirred tank reactors. Only microcrystalline materials are subject to a certain regulation or control, the shapes to be obtained resulting from the projection of the material specific crystal levels and for this reason again being limited.

SUMMARY OF THE INVENTION

It would be of advantage for many application purposes (chromatography, dyestuff and medicament production, etc.) to dispose of microparticles geometrically determinable within wide limits and reproducible, which microparticles at present being producible only in isolated cases with sufficient geometrical variability and structure.

As described by POHL already in 1978 in a monography (POHL, H. P., Dielectrophoresis, Cambridge Press, Cambridge 1978), electric fields can be used for collecting particles and cells in liquid media. For this purpose, he and further authors (e. g. T. B. JONES, J. Electrostatics 18, 55–62 (1986) and others) used in most cases macroscopic electrode arrangements. Under these circumstances, the shaping of bodies was not possible.

The development of high frequency field cages on the basis of microelectrodes produced with semiconductor technology methods represented a decisive step (T. SCHNELLE et al. Biochim. Biophys. Acta 1157, 127–140 (1993)). They served for the trapping and manipulation of cells and very small particles in microchannel and reaction systems and were based on macroscopic field cages as known from high-energy physics (W. PAUL et al., Forschungsberichte des Wirtschaftsministeriums Nordrhein-Westfalen, No. 145 and No. 450 (1958)). It could also be demonstrated that small particles, such as latex spheres having a size of a few micrometers; e.g. 3.4 $\mu$m or 9.9 $\mu$m, are collected to aggregates in free solution by negatively dielectrophoretic forces and that they adopt an other shape dependent on the supply or drive of the field (G. FUHR et al. Biochim. Biophys. Acta 1108, 215–223 (1992)). However, the formed bodies decompose or dissociate after switching-off the field.

In view of prior art, the object of the present invention is the assembly and permanent shaping of microparticles and/or droplets of a liquid in a surrounding solution by means of electric fields. This object is achieved with the process and arrangement according to the invention. In said process and arrangement, viruses or macromolecules may be used. The resulting products are advantageously used in the virological, pharmacological and dying and coloring technical fields. They may also be used as particles for filter systems and as particles for chromatographic separation technology.

Said bodies shaped by microforce substantially keep their shape und may be treated similar to or such as a solid body still after switching off the field and removing them from the field cage.

Other aspects of the invention include the electrically controllable shaping of a particle aggregate or a quantity of a liquid by means of three-dimensionally arranged microelectrodes and chemical and/or physical consolidation of said body under field influence.

Strong electric field gradients forming a field cage, are provided by microelectrodes arranged three-dimensionally in the micrometer or submicrometer range (below 1 $\mu$m) and defining or surrounding but not completely delimiting a reaction space fillable with a liquid. When applying signal frequencies in the kHz to GHz range, microparticles or liquid droplets of a second liquid or a number of liquids which are not or only partly miscible with said first liquid may be trapped and/or assembled to larger bodies in said field cage. Said particles or droplets have a lower conductivity and/or relative dielectric constant compared with the surrounding medium. They are then repelled (negative dielectrophoresis) off said electrodes also in case of A.C. supply and assemble in field minima usually being located in the free solution. There, said particle aggregates or droplets adopt controllable shapes dependent on amplitude, frequency and phase relationship of the alternating signals, but also dependent on the geometry and position of said electrodes.

In exceptional cases (liquids with extremely low conductivity), low frequencies or direct current are used.

According to the invention, aggregation as well as reproduction of said particles or consolidation of droplets is induced under field effect, either chemically (e. g. polymerization, two- or multicomponent systems) or physically (e. g. cooling, crystallization). The shaped particle not contacting the electrodes, but being maintained freely suspended in the surrounding solution by the field, it may easily be removed from the electrode space after shaping and consolidation.

With the present invention, corresponding particles may be formed also in the submicrometer range (smaller than 1 μm). The size of the particles depends substantially on the execution (geometry, disposition) of the electrodes shaping them. For the shaping of correspondingly small particles, the electrodes also have to be provided correspondingly small (in the submicrometer range). However, the electrodes may be 2 to 10 times larger than the particle to be shaped. They may also be correspondingly spaced apart. The smaller the geometry of the electrodes is selected, the smaller is the danger of electrolysis or dissolution of electrodes, so that also highly conductive surrounding liquids (e. g. suction cell cultures) may be used. A further advantage is that the occurring heat may better be dissipated.

With said process, the shaping or encapsulating of living cells to homo- or hetero-aggregates in highly conductive media, such as animal cell culture media, is possible.

If a number of field cage systems are arranged side by side (lined up), complex cross-linked and elongated particle systems or particle systems filigrainedly interspersed in a space may be produced.

The electrodes may be produced by semiconductor technology methods. In most cases, they are flat and electroplated on a carrier. An applicable thickness is 0.5 μm, usable carriers are for example quartz glass or semiconductor materials. The three-dimensional arrangement may be obtained by micromanipulators.

If said electrodes directly contact said particle suspension (surrounding solution) only in a small area, highly conductive solutions/suspensions may be used (e. g. the physiological nutrient solution DMEM).

If the solution has a low conductivity and the electrodes are larger, they may be completely covered.

Typical dimensions of the particles or dispersed phases are in at least two dimensions (orders of magnitude) of micrometer and submicrometer range.

DETAILED DESCRIPTION OF THE PREFERRED EMBODIMENTS

In the following, preferred embodiments of the present invention are described in detail with reference to the accompanying schematic drawings.

Figure 1:
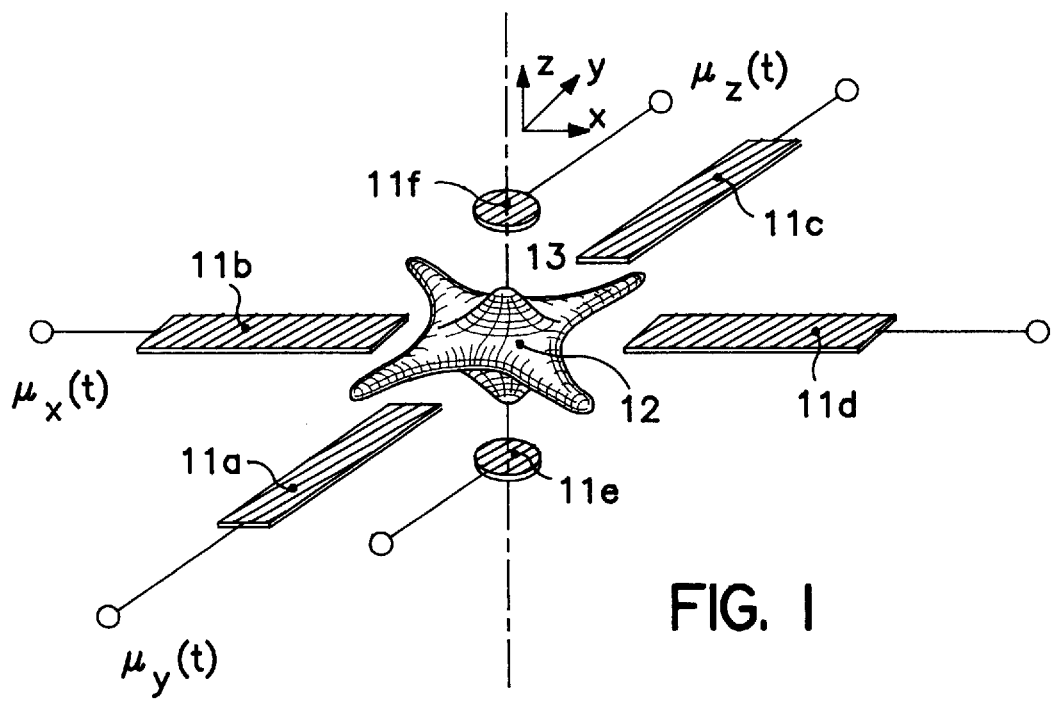
FIG. 1 is a pictorial view of a quadrupole electrode arrangement in accordance with the invention.

FIG. 1 illustrates the shaping of particles and a possible arrangement of electrodes 11. In the illustrated embodiment, the electrodes are arranged in three planes. An electrode 11f is located in the uppermost plane, electrodes 11a, 11b, 11c and 11d are arranged below, in a quadrupole arrangement and an electrode 11e is located in the lowest plane. The spatial arrangement of said electrodes 11 defines or forms a reaction space.

An A.C. voltage $u_z(t)$ is applied to electrodes 11e and 11f and a rotating field ($u_x(t)$, $u_y(t)$) is applied to electrodes 11a to 11d. A liquid 13 (in the following designated as "surrounding solution") may be introduced or washed in through feeding channels or laterally between said electrodes, in which liquid small particles, cells or gas bubbles or droplets of a further liquid phase may be suspended. The occurrence of repelling polarization forces (always in case of the conductivity or dielectric constant of the particles being smaller than that of the surrounding solution at a given frequency) may be achieved by suitably selecting the dielectric constant and/or the specific conductivity of the particles 12 and the surrounding solution 13. The particles or droplets 12 are then focussed in the central part of the reaction volume 13 ("reaction space") at field strengths of more than 1 kV/m and shaped to a non-spherical body 12 dependent on the drive or supply mode of said electrodes 11, said body maintaining its shape as said field is maintained.

Having achieved the desired size and shape, the shaped body is hardened by a chemical process (e. g. photopolymerization) or a physical process (e. g. cooling) and thereafter removed from or washed out of the reaction space. The dimensions of said electrodes 11 and their interspaces being selected in the micrometer and particularly also in the submicrometer range, shaped microparticles 12 with a size in said range are obtained.

Figure 2:
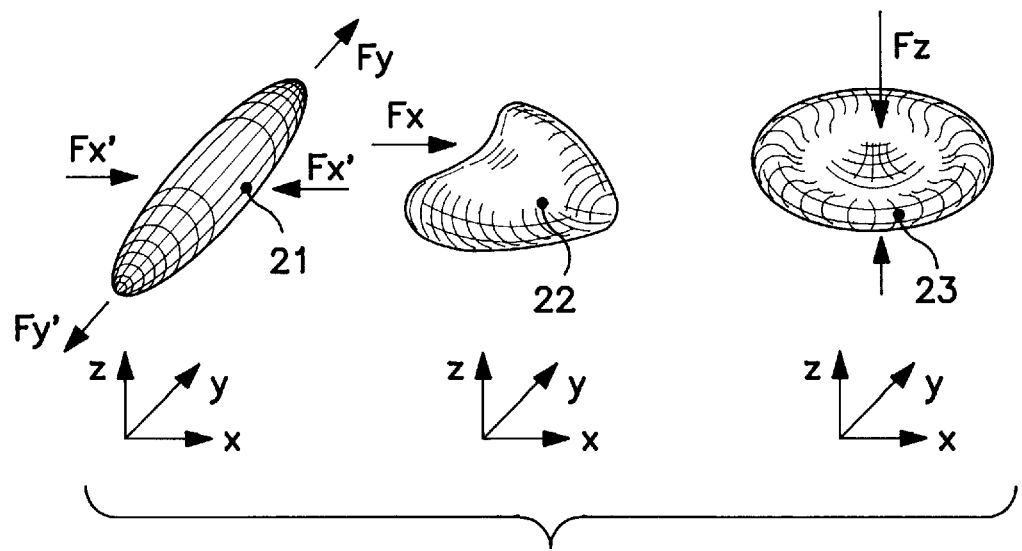
FIG. 2 is a pictorial view of different shaped particles produce in accordance with the invention.

FIG. 2 shows different shapes of microparticles to be produced in field cages. A spindle 21 is obtained by only weakly driving electrodes 11f and 11e (lower amplitude than on 11a to 11d). A heart-shaped body 22 for example is achievable by increasing the amplitude on electrode 11b. A disc being dented on the surfaces, similar to the shape of a human erythrocyte (red blood cell), is obtained by increasing the amplitude on electrodes 11e and 11f with respect to 11a to 11d and by using less original material. By reducing the amplitude on 11e 11f, a particle 12 according to FIG. 1 is obtained. The particularly emphasized forces $F_x$, $F_y$, $F_z$ respectively are designated corresponding to the system of coordinates of FIG. 1.

Figure 3:
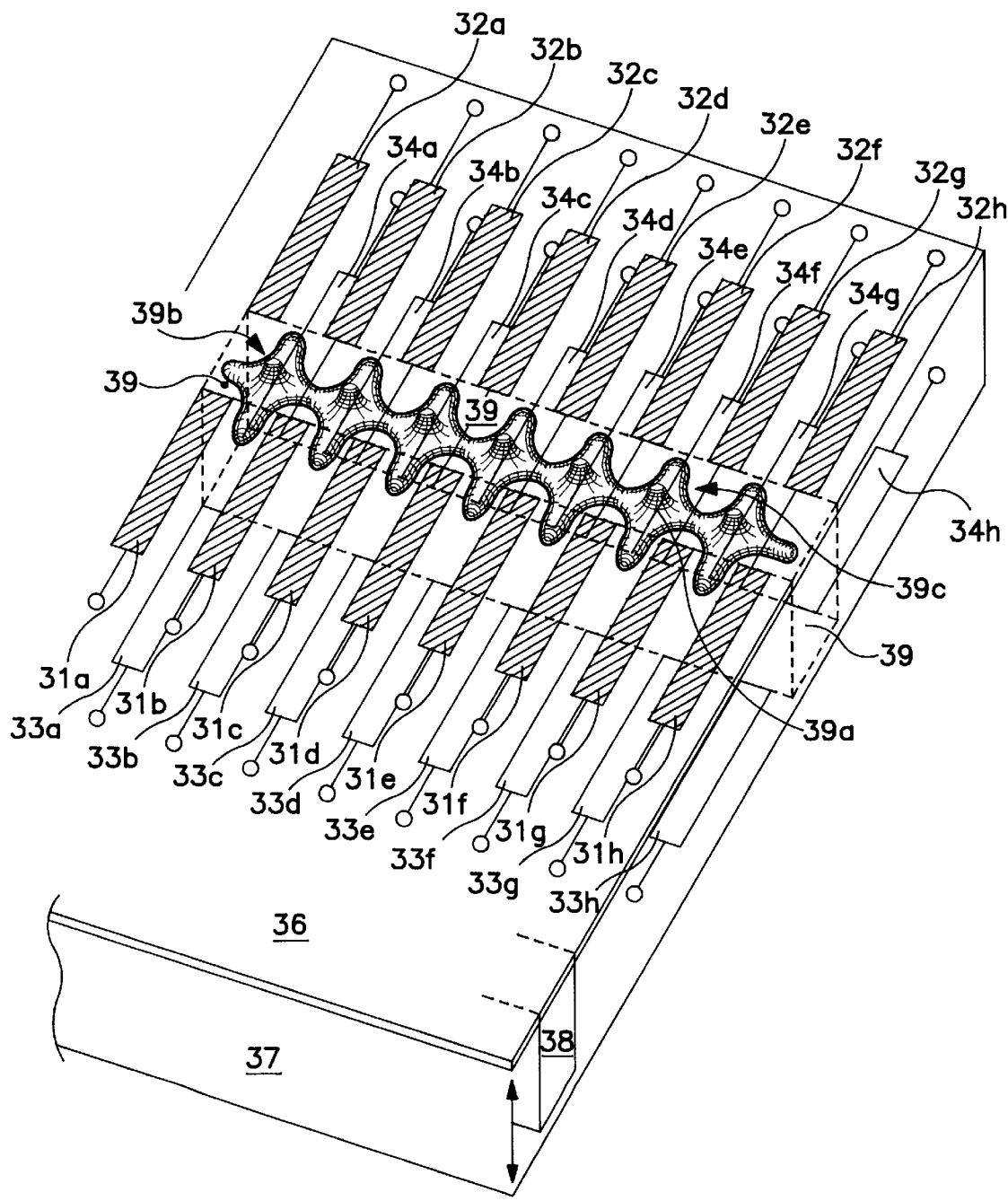
FIG. 3 is a pictorial view of an octopole electrode arrangement having electrodes arranged in rows in accordance with the invention.

FIG. 3 shows an arrangement of electrode rows 31a to 31h, 32a to 32h, 33a to 33h and 34a to 34h being located in two planes 36,37 delimiting a channel 39 and forming octupole field cages lined up in sequence therein. Both planes 36,37 have an interspace corresponding to the gap width of the electrode rows 31 and 32. A spacer 38 may permanently fix said interspace. This kind of arrangement is used in semiconductor hybrid production technology. A surrounding liquid 39a and a particle fraction or phase 39b are introduced into said channel 39, said particle fraction or phase being shapable and cross-linkable if sufficient material is added. During or after hardening, the shaped band or chain 39b may be removed continuously or discontinuously from said channel 39.

Figure 4:
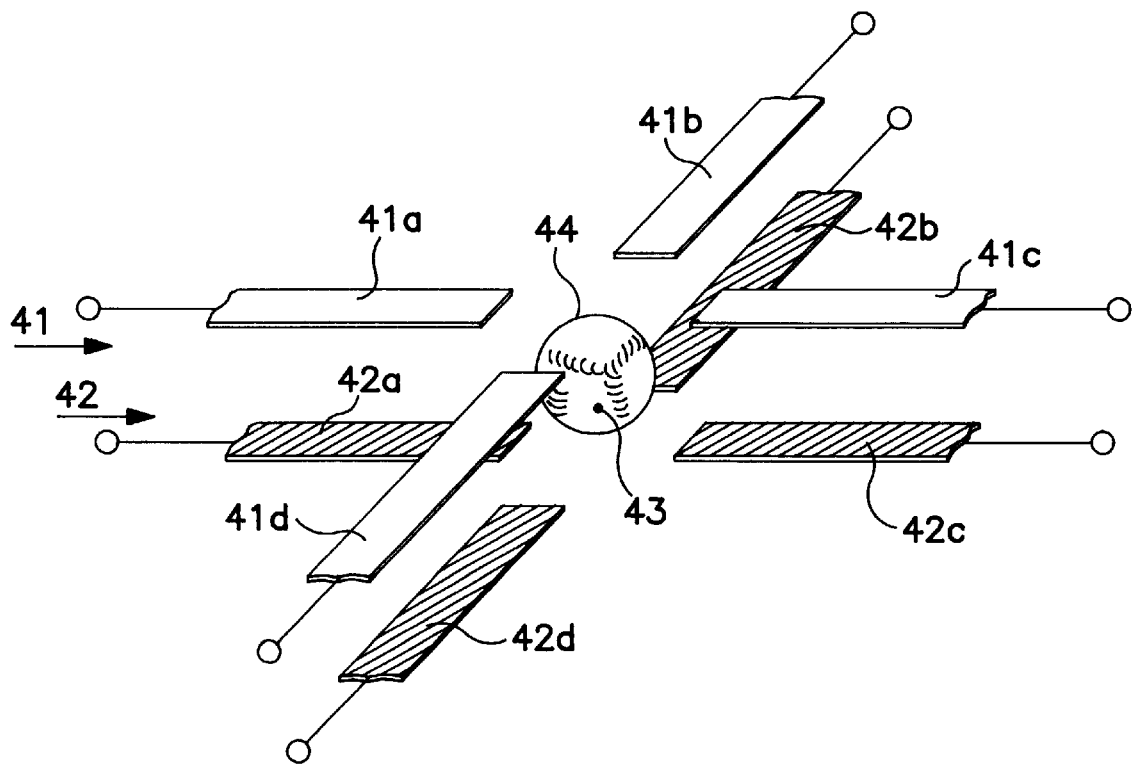
FIG. 4 is a pictorial view of an alternate octopole electrode arrangement having two groups of four electrodes each in two planes in accordance with the invention

FIG. 4 shows an octupole arrangement 41,42 consisting of four electrodes each in two planes (41a to 41d and 42a to 42d). Said arrangement may easily be produced up to submicrometer size (width, height, interspace) of the electrodes on silicon wafers. Alternating or rotating fields may be applied with frequencies up to the upper MHz range. Bodies 43 are shaped and hardened corresponding to FIG. 1 in a reaction space 44.

Figure 5:
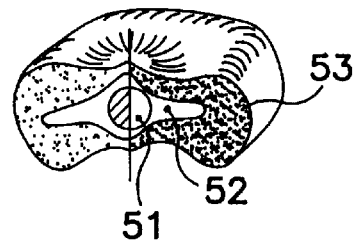
FIG. 5 is a partial sectional view of a particle produce in accordance with the invention.

FIG. 5 is a sectional view illustrating the structure of a shaped body, wherein at first the inner body 51 was shaped and hardened (sphere); subsequently, at different voltage supply, a first encapsulation 52 and a further encapsulation having again different geometry 53 were formed. Said encapsulation technology may be continued. The dosing of medicaments is a possible application of said shape.

Figure 6:
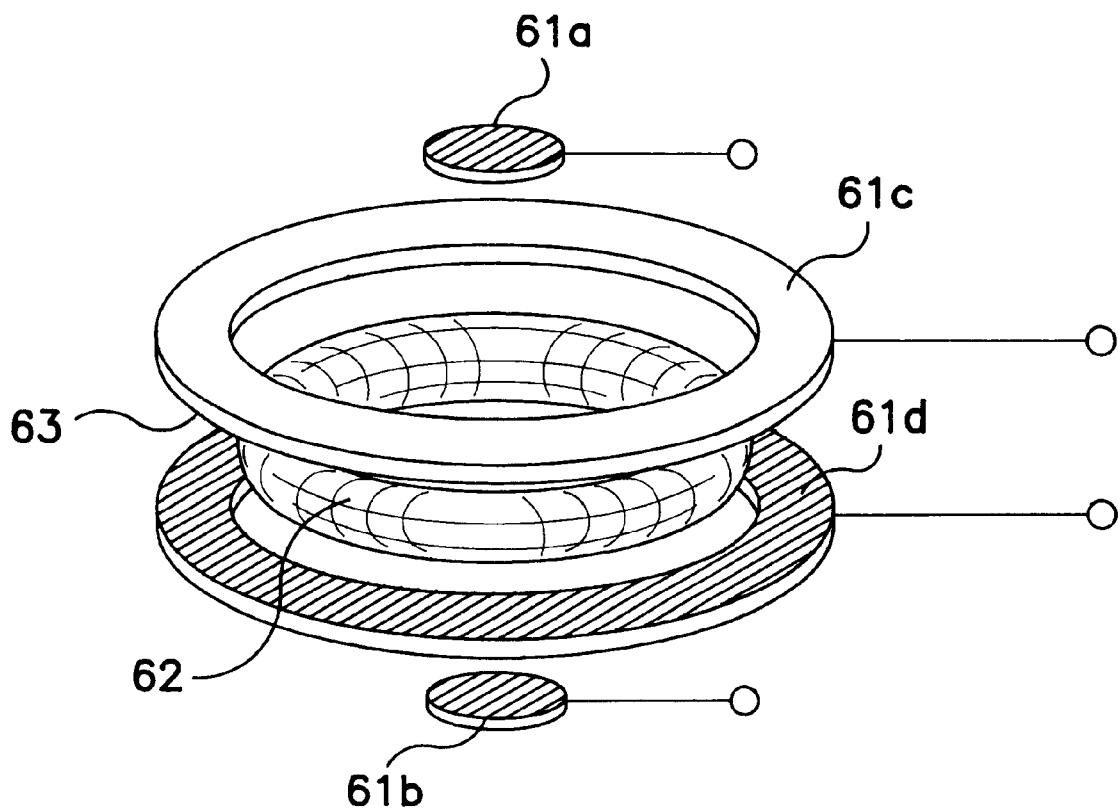
FIG. 6 is a pictorial view of a electrode for producing a microtoriodal particle in accordance with the invention

FIG. 6 illustrates an electrode arrangement 61 for the shaping of a microtoroidal particle 62 in a reaction space 63. Electrodes 61a and 61b are required for the shaping of the ring and annular electrodes 61c and 61d for its stabilization. Said electrodes 61a to 61d are arranged in four parallel planes. In case of a symmetric torus 62—to be shaped—, said electrodes 61a, 61b are arranged in the axis of said annular electrodes 61c, 61d, and the interspace above electrode 61c and below electrode 61b is selected dependent to field strength and frequency at electrodes 61a, 61b.

Driving is effected by alternating voltages.

Figure 7:
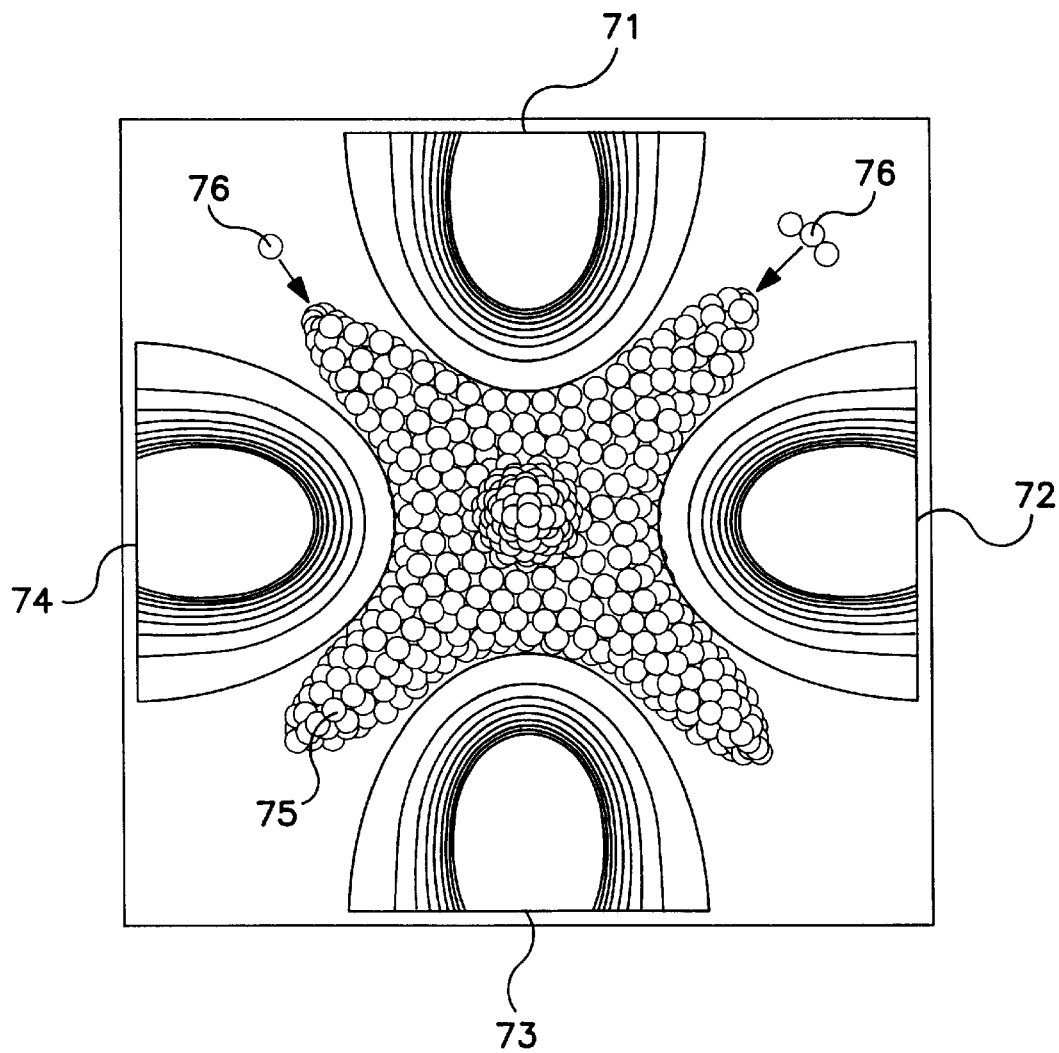
FIG. 7 is a schematic representation of the forces present in an octupole electrode arrangement in accordance with the invention.
Figure 1:
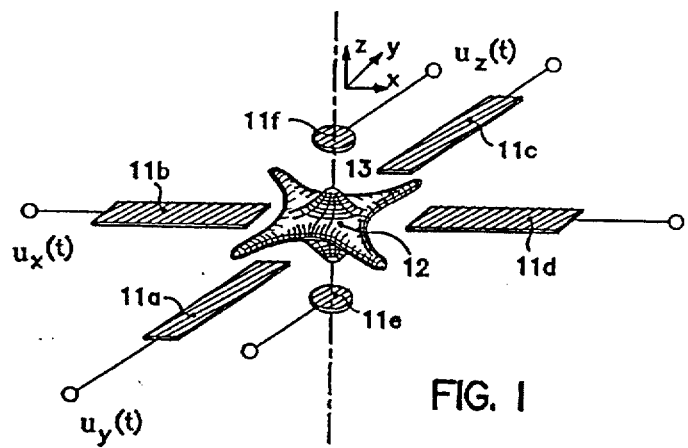
Figure 2:
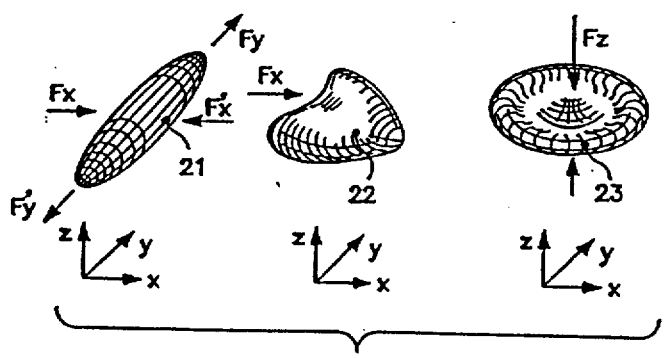
Figure 6:
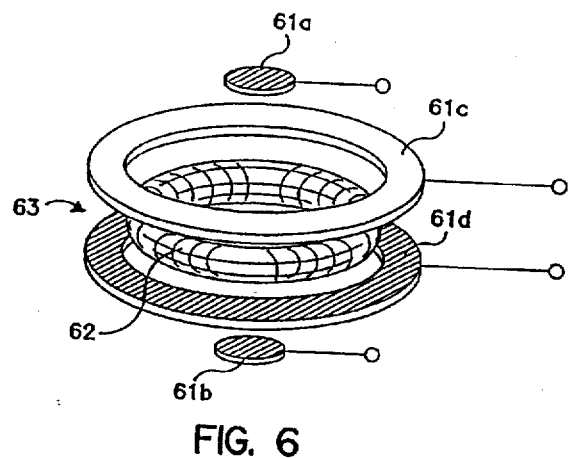

FIG. 7 is a schematic representation showing how the forces in the illustrated octupole cages act upon the particles to be shaped. The representation shows the center plane of e.g. cage 11a,11b,11c,11d of FIG. 1; the illustration could as well be a sectional view in a plane perpendicular to the extension of channel 39 of FIG. 3. In FIG. 7, the electrodes are designated with reference numerals 71–74, the black core representing the real electrodes, and lines of equal force (field lines) surrounding said core show the course and the direction of the forces acting upon particle 75. In this embodiment, particle 75 is a particle aggregate growing (at the star ends) by addition of further particles 76 and being shaped in the convex area (between said star ends) by force effect.

The force lines shield the electrodes 71–74 so that said particle aggregate 75 does not contact the real (metallic) electrode, thus being suspended—held by force lines—in the space or the surrounding liquid.

We claim:

1. Process for shaping at least one microparticle, comprising:

providing at least two spatially disposed electrodes thereby defining a reaction space fillable with a surrounding liquid, the electrodes having a width, a height and defining an interspace between the electrodes;

driving the electrodes with varying electrical voltages;

providing at least one of: at least one small particle; an aggregate of small particles; a surrounding liquid with at least one small particle suspended therein; a surrounding liquid with a dispersed phase; and a surrounding liquid with at least one small particle and a dispersed phase, at least one of a relative dielectric constant and a specific conductivity of the small particle and the dispersed phase, respectively, at a selected varying electrical voltage of said electrodes being lower than that of said surrounding liquid;

at least partially immersing the electrodes in the surrounding liquid thereby filling the reaction space with surrounding liquid;

wherein forces due to the varying electrical voltages driving the electrodes act on one of said at least one small particle and said dispersed phase, the varying electrical voltages driving the electrodes being adjusted such that at least one of said at least one small particle suspended in said surrounding liquid and said dispersed phase is formed as a differently shaped microparticle and at least partially permanently shaped by one of cross-linking, hardening and solidifying.

2. Shaping of at least one microparticle according to claim 1, wherein the microparticle has a body that is solidified by chemical reaction induced by at least one of an optical stimulation, addition of substances and electropolymerization.

3. Shaping of at least one microparticle according to claim 2 wherein two or more different compositions react with each other thereby inducing permanent shaping.

4. Shaping of at least one microparticle according to claim 1, wherein the microparticle has a body that is solidified by a physical process.

5. Shaping of at least one microparticle according to claim 1, wherein the forces due to the varying electrical voltages driving the spatially disposed electrodes form a field in the reaction space and at least one of arranged and unarranged microparticles are assembled into an aggregate in the field of the reaction space.

6. Shaping of at least one microparticle according to claim 1, wherein the forces due to the varying electrical voltages driving the spatially disposed electrodes form a field cage and a plurality of adjacent spatially disposed electrodes are provided defining a plurality of adjacent field cages and a plurality of microparticles are formed adjacent to each other in the plurality of adjacent field cages.

7. Shaping of at least one microparticle according to claim 6, wherein the plurality of microparticles formed adjacent to each other are at least partially assembled in the field cages after addition of at least one further material.

8. Shaping of at least one microparticle according to claim 6, wherein the plurality of adjacent spatially disposed electrodes are arranged to form a channel as the reaction space and a microparticle in a form of one of a band and a chain of predeterminable length is formed in the plurality of adjacent field cages along the reaction space channel.

9. Shaping of at least one microparticle according to claim 8, wherein the reaction space is elongated for the production of band-shaped microstructures, the reaction space being defined by a plurality of electrode multipoles disposed along said reaction space, the multipoles being arranged in a plane perpendicular an extension of the elongated reaction space.

10. Shaping of at least one microparticle according to claim 9, wherein the electrode multipoles have at least two electrodes provided on at least two sides along the reaction chamber and wherein one of the width and the height of the electrodes is less than 1 $\mu$m.

11. Shaping of at least one microparticle according to claim 9, wherein each one of the electrode multipoles is a quadrupole.

12. Shaping of at least one microparticle according to claim 9, wherein more than two electrode multipoles are lined up in sequence along the extension of the elongated reaction space.

13. Shaping of at least one microparticle according to claim 1, wherein the varying electrical voltages produces high frequency electric fields at the electrodes in the kHz to GHz range.

14. Shaping of at least one microparticle according to claim 1, wherein at least one of the at least two spatially disposed electrodes is at least partially isolated from the surrounding liquid so that only a non-isolated portion of the at least two electrodes is in contact with the surrounding liquid.

15. Shaping of at least one microparticle according to claim 14, wherein said at least two spatially disposed electrodes are fully isolated, for coupling the electrical voltage induced forces into a solution having a low conductivity.

16. Shaping of at least one microparticle according to claim 1, wherein at least one of the spatially disposed electrodes comprises one of a semiconductor and an electrode driven by a semiconductor.

17. Shaping of at least one microparticle according to claim 1, wherein the spatially disposed electrodes are positioned in a three-dimensional arrangement thereby defining at least one feeding channel providing said reaction space.

18. Shaping of at least one microparticle according to claim 1, wherein the microparticle has a body at least partially assembled from small particles formed of a first composition and wherein second small particles formed of at least one of the first composition and a different composition are introduced into said reaction space and are at least partially assembled thereby forming an encapsulation, encapsulating the body and forming at least two layers.

19. Shaping of at least one microparticle according to claim 18, wherein the electrodes are driven with first varying electrical voltages and the microparticle is at least partially assembled from small particles formed of the first composition, and then the electrodes are driven with second varying electrical voltages when the microparticle is at least partially assembled from small particles formed of at least one of the first composition and the different composition, to shape an outer layer of the at least two layers differently from a shape of an inner one of the two layers.

20. Shaping of at least one microparticle according to claim 18, wherein third small particles comprising at least one of solid bodies, droplets, living cells and hollow spaces filled with gas, are introduced inside said encapsulation.

21. Shaping of at least one microparticle according to claim 18, wherein the microparticle has a body at least partially assembled from small particles formed of a first composition and are at least partially solidified and wherein second small particles formed of at least one of the first composition and a different composition are introduced into said reaction space and are at least partially assembled thereby encapsulating the body and forming at least two layers.

22. Shaping of at least one microparticle according to claim 1, wherein the microparticle has an outer surface that is only partly solidified.

23. Shaping of at least one microparticle according to claim 1, wherein a quantity of material, comprising one of a small particle, a dispersed phase and an aggregation of small particles, is added to said reaction space defined by front areas of said electrodes, and said electrodes are driven such that said body shaped in said reaction space protrudes from said reaction space by extending beyond tips of the electrodes.

24. Shaping of at least one microparticle according to claim 1, wherein the forces due to the varying electrical voltages driving the spatially disposed electrodes form a field in the reaction space and wherein the microparticle has a body that is only partially solidified inside the field, the microparticle being removable from said reaction space by one of elastic and plastic deformation, and is subjected to further solidification outside said reaction space.

25. Shaping of at least one microparticle according to claim 1, wherein the microparticle encapsulates a gas bubble.

26. Shaping of at least one microparticle according to claim 1, wherein
the surrounding liquid contains at least one of living cells, cells dividing and growing in the reaction space, immobilized cells, and dead cells that are assembled into a microparticle in the reaction space.

27. Shaping of at least one microparticle according to claim 1, wherein the small particles are at least one of viruses and macromolecules.

28. Shaping of at least one microparticle according to claim 1, wherein the microparticles are assembled into at least one of a disc and a disc with an indentation and are at least one of smaller than and as large as blood cells, thereby corresponding in geometry to the blood cells.

29. Shaping of at least one microparticle according to claim 1, wherein the at least two spatially disposed electrodes define at least one microchannel and the surrounding liquid is introduced into the reaction space and removed from the reaction space through the microchannel.

30. Shaping of at least one microparticle according to claim 1, wherein the microparticle is at least one of asymmetrical and perforated.

31. Shaping of at least one microparticle according to claim 1, wherein the microparticle is at least one of shaped, deformed and dielectrically broken at least one of during and after solidifying.

32. Shaping of at least one microparticle according to claim 1, wherein the surrounding liquid at least one of de-mixes and dissociates into different phases after introducing into the reaction space.

33. Shaping of at least one microparticle according to claim 32, wherein de-mixing is induced via said electrodes by at least one of ultrasonics or electric fields.

34. Shaping of at least one microparticle according to claim 1, wherein the microparticle has a body that is shaped to a predetermined mass by at least one of addition of material and removal of material by one of caustic and ablation.

35. Shaping of at least one microparticle according to claim 1, wherein the microparticle has a body that is shaped by a liquid stream.

36. Shaping of at least one microparticle according to claim 1, wherein the surrounding liquid is at least one of modified and exchanged during a time interval provided during assembly and solidification.

37. Shaping of at least one microparticle according to claim 1, comprising selecting a predetermined shape and driving the electrodes with controlled varying electrical voltages thereby consolidating the small particles to obtain said predetermined shape.

38. Shaping of at least one microparticle according to claim 1, wherein:
(a) the varying electrical voltages have an A.C. signal upon which a D.C. voltage component is superimposed; and
(b) at least one of the A.C. and D.C. signal components are intermittently switched off during assembly of the microparticle.

39. Shaping of at least one microparticle according to claim 1, wherein the microparticle is shaped by suspending the at least one small particle, dispersed phase and particle aggregate in the surrounding liquid.

40. Shaping of at least one microparticle according to claim 1, wherein the interspace between the electrodes is less that 10 $\mu$m.

41. Shaping of at least one microparticle according to claim 1, wherein the interspace between the electrodes is less that 1 $\mu$m.

42. Shaping of at least one microparticle according to claim 1, wherein one of the height and width of the electrodes is less that 10 $\mu$m.

43. Shaping of at least one microparticle according to claim 1, wherein one of the height and width of the electrodes is less that 1 $\mu$m.

44. Shaping of at least one microparticle according to claim 1, wherein the microparticle has a body at least partially assembled from living cells and wherein second small particles formed of a different composition are introduced into said reaction space and the body is at least partially assembled from the second small particles thereby encapsulating the body and forming at least two layers, said encapsulation being at least one of permeable or perforated.

45. A process for shaping at least one microparticle, comprising:

providing at least two spatially disposed electrodes thereby defining a reaction space fillable with a surrounding liquid, the electrodes having a width, a height and defining an interspace between the electrodes;

driving the electrodes with varying electrical voltages;

providing at least one of: at least one small particle; an aggregate of small particles; a surrounding liquid with at least one small particle suspended therein; a surrounding liquid with a dispersed phase; and, a surrounding liquid with at least one small particle and a dispersed phase, at least one of a relative dielectric constant and a specific conductivity of the small particle and the dispersed phase, respectively, at a selected varying electrical voltage of said electrodes being lower than that of said surrounding liquid;

at least partially immersing the electrodes in the surrounding liquid thereby filling the reaction space with surrounding liquid;

wherein forces due to the varying electrical voltages driving the electrodes act on one of said at least one small particle and said dispersed phase, the varying electrical voltages driving the electrodes being adjusted such that at least one of said at least one small particle suspended in said surrounding liquid and said dispersed phase is formed as a differently shaped microparticle and at least partially permanently shaped by one of cross-linking, hardening and solidifying; and, wherein the forces due to the varying electrical voltages driving the spatially disposed electrodes form a field cage and a plurality of adjacent spatially disposed electrodes are provided defining a plurality of adjacent field cages and a plurality of microparticles are formed adjacent to each other in the plurality of adjacent field cages, the adjacent spatially disposed electrodes being arranged to form a channel as the reaction space and a microparticle in a form of one of a band and a chain of predeterminable length is formed in the plurality of adjacent field cages along the reaction space channel, the reaction space being defined by a plurality of electrode multipoles disposed along said reaction space, the multipoles being arranged in a plane perpendicular an extension of the elongated reaction space.

46. The process according to claim 45, wherein the electrode multipoles have at least two electrodes on at least two sides along the reaction chamber and wherein one of the width and the height of the electrodes is less than 1 $\mu$m.

47. The process according to claim 45, wherein each one of the electrode multipoles is a quadrupole.

48. The process according to claim 45, wherein more than two electrode multipoles are lined up in sequence along the extension of the elongated reaction space.

* * * * *

UNITED STATES PATENT AND TRADEMARK OFFICE
CERTIFICATE OF CORRECTION

PATENT NO. : 5,948,328
DATED : September 7, 1999
INVENTOR(S) : Fiedler et al

It is certified that error appears in the above-identified patent and that said Letters Patent is hereby corrected as shown below:

The Drawing Sheets, consisting of Figs. 1,2 and 6, should be deleted to replaced with the Drawing Sheets, consisting of Figs. 1,2 and 6, as shown on the attached page.

Signed and Sealed this

Twenty-ninth Day of August, 2000

Attest:

Q. TODD DICKINSON

Attesting Officer

Director of Patents and Trademarks